(12) United States Patent
Patil et al.

(10) Patent No.: US 9,471,586 B2
(45) Date of Patent: Oct. 18, 2016

(54) INTELLIGENT SELECTION OF REPLICATION NODE FOR FILE DATA BLOCKS IN GPFS-SNC

(71) Applicant: International Business Machines Corporation, Armonk, NY (US)

(72) Inventors: Sandeep R. Patil, Pune (IN); Prasenjit Sarkar, San Jose, CA (US); Riyazahamad M. Shiraguppi, Pune (IN); Gandhi Sivakumar, Melbourne (AU)

(73) Assignee: International Business Machines Corporation, Armonk, NY (US)

(*) Notice: Subject to any disclaimer, the term of this patent is extended or adjusted under 35 U.S.C. 154(b) by 598 days.

(21) Appl. No.: 13/738,033

(22) Filed: Jan. 10, 2013

(65) Prior Publication Data

US 2014/0195488 A1    Jul. 10, 2014

(51) Int. Cl.
*G06F 17/30* (2006.01)

(52) U.S. Cl.
CPC .............................. *G06F 17/30159* (2013.01)

(58) Field of Classification Search
CPC ................... G06F 17/30156; G06F 17/30584; G06F 17/30159
USPC ................................................ 707/634, 610
See application file for complete search history.

(56) References Cited

U.S. PATENT DOCUMENTS

| | | | |
|---|---|---|---|
| 6,321,238 B1 | 11/2001 | Putzolu | |
| 7,139,772 B2 | 11/2006 | Bamford et al. | |
| 7,287,186 B2 | 10/2007 | McCrory et al. | |
| 7,624,155 B1 | 11/2009 | Nordin et al. | |
| 7,774,311 B2 | 8/2010 | Cox et al. | |
| 7,778,183 B2 | 8/2010 | Fan et al. | |
| 7,778,972 B1 | 8/2010 | Cormie | |
| 8,099,571 B1 | 1/2012 | Driscoll et al. | |
| 8,667,235 B2 * | 3/2014 | Williams et al. | 711/161 |

(Continued)

FOREIGN PATENT DOCUMENTS

WO    WO2011/160054 A1    12/2011

OTHER PUBLICATIONS

Bin Cai et al., "EDRFS: An Effective Distributed Replication File System for Small-File and Dta-Intensive Application", COMSWARE, 2007, $2^{nd}$ International Conference.*

"A Method of Intelligent Virtual Disk Replication in System Z Centric Hybrid Computing Environments", ip.com No. IPCOM000214720D, www.ip.com, http://ip.com/IPCOM/000214720, Feb. 3, 2012, 7 pages.

(Continued)

*Primary Examiner* — James Trujillo
*Assistant Examiner* — Fariborz Khoshnoodi
(74) *Attorney, Agent, or Firm* — Stephen R. Tkacs; Stephen J. Walder, Jr.; Randall J. Bluestone

(57) ABSTRACT

A mechanism is provided in a data processing system for replicating writing of a file with striping. The mechanism writes a file at an owner node within a plurality of nodes in a data processing system. The mechanism divides the file into a plurality of file chunks. The mechanism identifies at least one replication node within the plurality of nodes having a duplicate copy of a respective file chunk within the plurality of file chunks. The mechanism selects a plurality of replication nodes for the plurality of file chunks based on identification at least one replication node within the plurality of nodes having a duplicate copy of a respective file chunk and replicates the file at the plurality of replication nodes based on the selection of the plurality of replication nodes.

25 Claims, 6 Drawing Sheets

(56) References Cited

U.S. PATENT DOCUMENTS

| | | |
|---|---|---|
| 2005/0203908 A1 | 9/2005 | Lam et al. |
| 2007/0078911 A1 | 4/2007 | Lee et al. |
| 2008/0086483 A1* | 4/2008 | Park et al. ............... 707/10 |
| 2009/0199199 A1* | 8/2009 | Pooni et al. ............ 718/105 |
| 2010/0312749 A1 | 12/2010 | Brahmadesam et al. |
| 2011/0276538 A1* | 11/2011 | Knapp et al. ............ 707/626 |
| 2014/0237614 A1* | 8/2014 | Irvine ............ G06F 21/6218 726/26 |
| 2015/0324123 A1* | 11/2015 | Storer ............... G06F 3/061 714/6.24 |

OTHER PUBLICATIONS

Cai, Bin et al., "EDRFS: An Effective Distributed Replication File System for Small-File and Data-Intensive Application", COMSWARE, 2007, 2nd International Conference, http://ieeexplore.ieee.org/xpl/login.jsp?tp=&arnumber=4268065&url=http%3A%2F%2Fieeexplore.ieee.org%2Fiel5%2F4267954%2F4267955%2F04268065.pdf%3Farnumber%3D4268065, Jan. 7-12, 2007, 7 pages.

* cited by examiner

| FILE | OWNER NODE | REPLICATION PEER NODES |
|---|---|---|
| FILE1 | NODE1 | NODE2, NODE3, NODE4 |
| FILE2 | NODE2 | NODE1, NODE3, NODE4 |
| FILE3 | NODE4 | NODE1, NODE5, NODE6 |

| FILE | BLOCK NO | REPLICATION NODE | HASH VALUE |
|---|---|---|---|
| FILE2 | 0 | NODE5 | a92343abcF123 |
| FILE2 | 1 | NODE2 | 87abd56f7456c |
| FILE2 | 2 | NODE6 | 54327ab8656ab |
| FILE1 | 0 | NODE2 | abd3428177676 |
| FILE1 | 1 | NODE2 | 1213bai879421 |
| FILE1 | 2 | NODE4 | 9049800815rs |

INTELLIGENT SELECTION OF REPLICATION NODE FOR FILE DATA BLOCKS IN GPFS-SNC

BACKGROUND

The present application relates generally to an improved data processing apparatus and method and more specifically to mechanisms for intelligent selection of replication node for file data blocks in general parallel file system, share nothing cluster.

A share nothing (SN) architecture is a distributed computing architecture in which each node is independent and self-sufficient, and there is no single point of contention across the system. More specifically, none of the nodes share memory or disk storage. Share nothing architecture is popular for Web development because of its scalability. A pure SN system can scale indefinitely simply by adding nodes in the form of inexpensive computers, because there is no single bottleneck to slow the system down. Share nothing architectures have become prevalent in the data warehousing space.

General parallel file system (GPFS) share nothing cluster (SNC) is a cluster file system for analytics and clouds designed to address latency issues with traditional storage area networks (SANs). GPFS is extended to provide high availability through advanced clustering technologies, dynamic file system management, and advanced data replication techniques. GPFS-SNC boasts twice the performance of competing architectures, supports portable operating system interface (POSIX) for backwards compatibility, and includes advanced storage features such as caching, replication, backup and recovery, and wide area replication for disaster recovery.

GPFS has the following key advantages:

Clustering: thousands of nodes, fast, reliable communication, common admin domain.

Shared disks: all data and metadata on disk accessible from any node, coordinated by distributed lock service.

Parallelization: data and metadata flow to/from all nodes from/to all disks in parallel; files striped across all disks.

SUMMARY

In one illustrative embodiment, a method, in a data processing system, is provided for replicating writing of a file with striping. The method comprises writing a file at an owner node within a plurality of nodes in a data processing system. The method further comprises dividing the file into a plurality of file chunks. The method further comprises identifying at least one replication node within the plurality of nodes having a duplicate copy of a respective file chunk within the plurality of file chunks. The method further comprises selecting a plurality of replication nodes for the plurality of file chunks based on identification at least one replication node within the plurality of nodes having a duplicate copy of a respective file chunk. The method further comprises replicating the file at the plurality of replication nodes based on the selection of the plurality of replication nodes.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a node selection mechanism for replication of a given file block in a general parallel file system share nothing cluster such that a replication peer node for given file chunk is selected based on the already present data contents at the given peer node. The mechanism may partition the file into multiple file chunks where each file chunk is a group of contiguous logical blocks of the file defined based on the application requirement. The mechanism selects replication peers to optimize data traffic during node-to-node replication and avoid duplicate replication data storage.

The mechanism may also define file chunks based on the duplicate file data blocks present at the replication peer node. This requires a hash repository, which stores hash value for blocks of the stored files. If the system already has a duplication engine, the mechanism may use the hash functionality of the duplication engine for the hash repository.

In accordance with the illustrative embodiments, the upper layer may determine an owner node for write affinity and list of peer nodes where the given file must be stored for replication. The mechanism consults the hash repository to determine replication nodes that already have some of the file chunks. The mechanism passes this information to the owner node, which refers this information and determines a replication node for each given file chunk. For peer nodes already having a given file chunk, the owner node passes a file chunk pointer, thus optimizing node-to-node duplicate data traffic. The replication node, responsive to receiving file chunk pointer information, stores pointer information as it is or creates a copy for file chunk locality.

Figure 1:
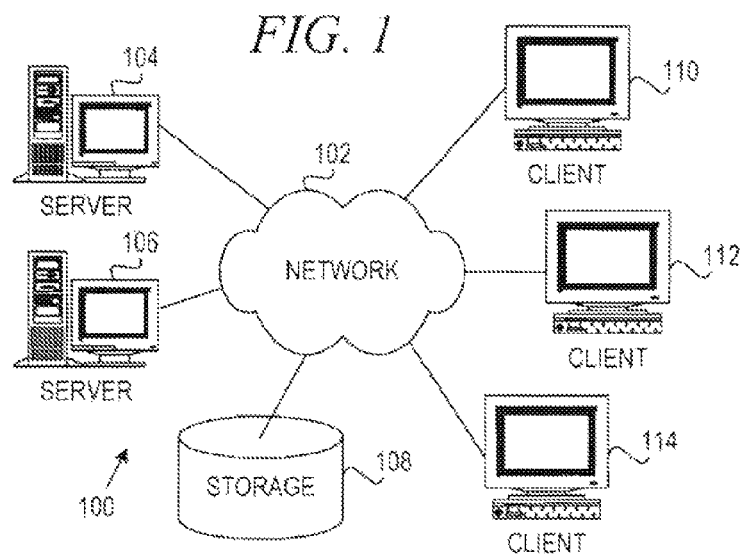
FIG. 1 is an example diagram of a distributed data processing system in which aspects of the illustrative embodiments may be implemented.
Figure 2:
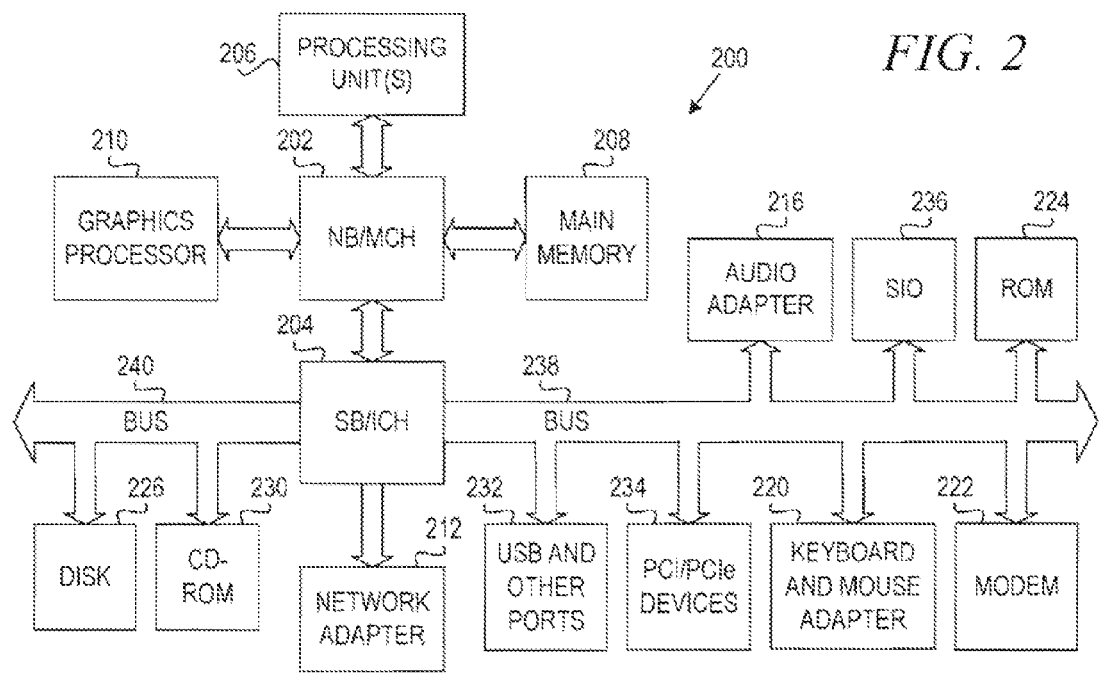
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
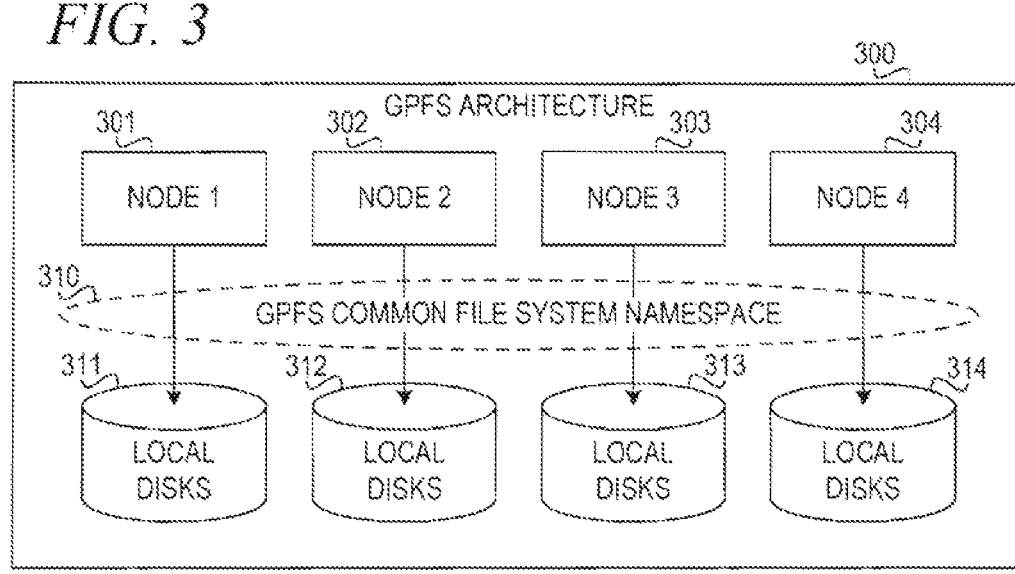
FIG. 3 is a block diagram of a general parallel file system in which aspects of the illustrative embodiments may be implemented.

FIG. 3 is a block diagram of a general parallel file system in which aspects of the illustrative embodiments may be implemented. General parallel file system (GPFS) architecture 300 has nodes 301, 302, 303, 304, which access respective local disks 311, 312, 313, 314 through GPFS common file system namespace 310. In a share nothing (SN) architecture, node 1 301 accesses local disks 311, node 2 302 accesses local disks 312, node 3 303 accesses local disks 313, and node 4 304 accesses local disks 314. That is, node 1 301 does not share local disks 311 with node 2 302, node 3 303, or node 4 304. Also, node 2 302 does not share local disks 312 with node 1 301, node 3 303, or node 4 304, and so on.

Figure 4A:
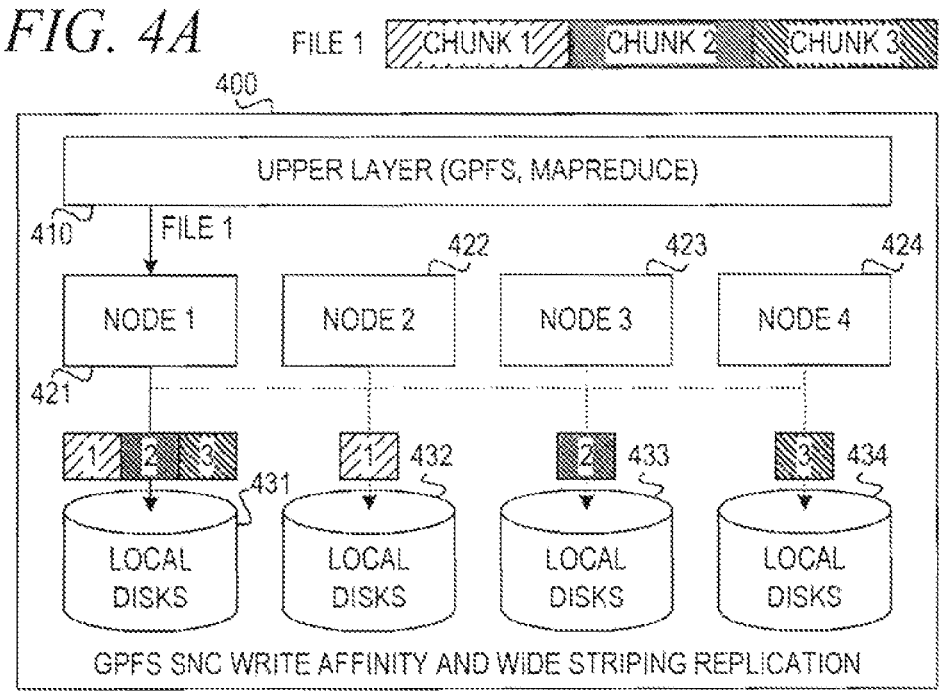
FIGS. 4A and 4B are block diagrams of a general parallel file system with write striping in which aspects of the illustrative embodiments may be implemented.
Figure 4B:
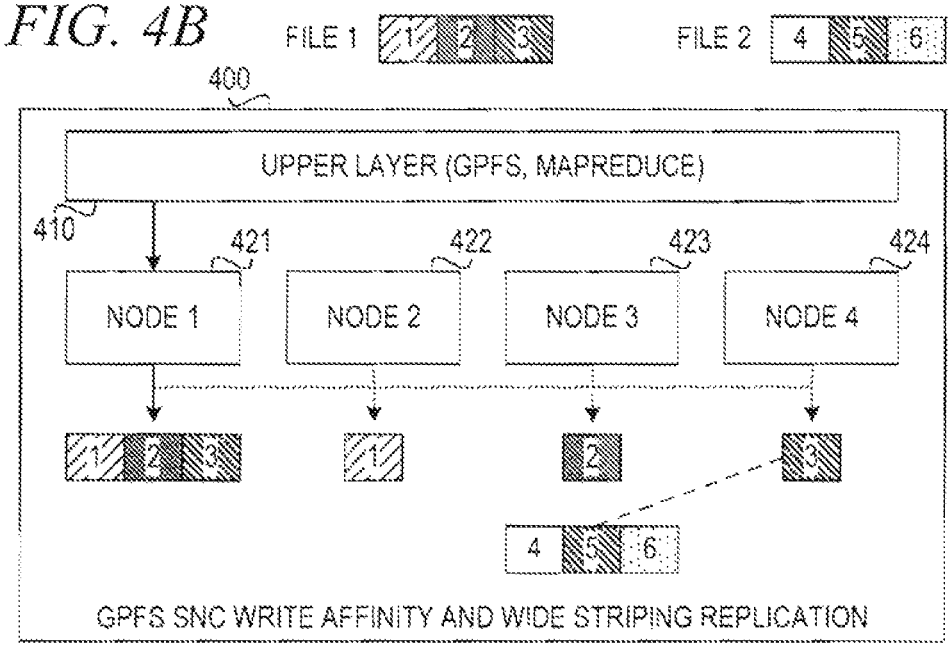

FIGS. 4A and 4B are block diagrams of a general parallel file system with write striping in which aspects of the illustrative embodiments may be implemented. With reference to FIG. 4A, general parallel file system (GPFS) architecture 400 has nodes 421-424, which access respective local disks 431-434. In GPFS SNC architecture, each node owns a separate data set and performs computing operations on the data set. Each node has a write affinity mechanism that prefers to store files from a given data set to the disks local to the assigned node. This node is called the owner for the data set. For example, for file 1, upper layer 410 issues the write of file 1 to the owner node 421, which writes the file to local disks 431.

For performance requirement, instead of having a single replication node, node 1 421 stripes file data across multiple nodes. This helps to speed up replication as file chunks can be transferred in parallel to multiple nodes. Each of these nodes is referred to as a "replication peer node," and the mechanism for striping file data across multiple nodes is referred to as "wide striping." Wide spread logic stores individual file chunk on each replication peer node.

In the depicted example, file 1 is divided into a plurality of chunks: chunk 1, chunk 2, and chunk 3. For write affinity, node 1 421 is the owner node and stores the entire file in local disks 431. For replication requirement, node 421 also sends a copy of chunk 1 to replication peer node 422, a copy of chunk 2 to replication peer node 423, and a copy of chunk 3 to replication peer node 424. Node 2 422 stores chunk 1 in local disks 432. Node 3 423 stores chunk 2 in local disks 433. Node 4 424 stores chunk 3 in local disks 434.

Turning to FIG. 4B, consider node 3 423 previously stored file 2 as the owner, thus storing chunk 4, chunk 5, and chunk 6 of file 2 in its local disks. When wide striping file 1, node 1 421 may assign chunk 3 to node 4 424. Chunk 3 of file 1 may be identical to chunk 5 of file 2. Therefore, node 4 424 stores data that is ready stored on node 3 423. This causes duplicate storage of data and also unnecessary usage of network bandwidth and, in turn, impacts latencies during data storage.

In accordance with an illustrative embodiment, GPFS architecture 400 is aware of the presence of duplicate data chunks and avoids network transfer and duplicate storage by assigning data chunks to replication peer nodes having duplicate chunks. Therefore, node 1 421 would assign chunk 3 to node 3 423, rather than node 4 424, because node 3 423 already stores duplicate chunk 5. Node 1 421 may then pass an information pointer instead of passing the chunk data to node 3 423.

Thus, in accordance with an illustrative embodiment, the GPFS architecture 400 is modified to influence node selection for replication of a given file chunk such that the replication peer node is selected based on the already present data contents at each peer node. The owner node partitions a file into multiple file chunks, where each file chunk is a group of contiguous logical blocks of the file defined based on application requirements. This will help to optimize data traffic during node-to-node replication to avoid duplicate data storage.

The owner node may assign file chunks based on the duplicate file data blocks present at the replication peer nodes. This requires a hash repository that stores hash values for blocks of the stored files. If the system already has a de-duplication engine, the system may use the hash functionality of the de-duplication engine for the hash repository.

In some embodiments, the de-duplication cannot be used due to wide split replication requirements and can potentially destroy locality, which is very essential for MapReduce of GPFS SNC.

In one illustrative embodiment, the upper layer determines the owner node for write affinity and a list of peer nodes where the given file must be stored for replication. The upper layer consults the hash repository to determine replication nodes that already have some of the file chunks. The upper layer passes this information to the owner node. The owner node refers to this information and decides the replication node for each given file chunk. For peer nodes already having a given file chunk, the owner node passes a file chunk pointer to the corresponding node, thus optimizing node-to-node duplicate data traffic. The replication node, on receiving file chunk pointer information, stores the pointer information as-is or creates a copy of the file chunk locally.

Figure 5:
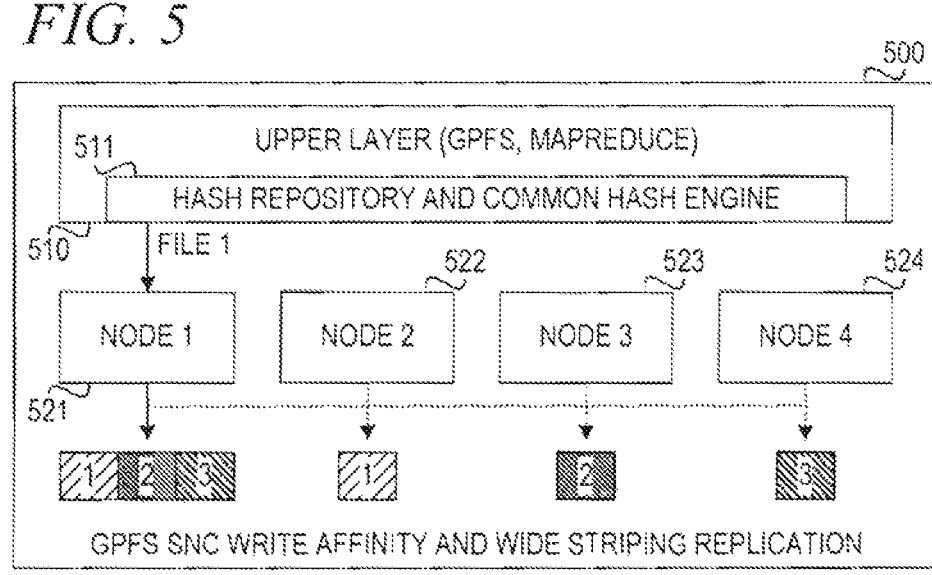
FIG. 5 is a block diagram of a general parallel file system with write striping using an upper layer hash engine in accordance with an illustrative embodiment.

FIG. 5 is a block diagram of a general parallel file system with write striping using a common hash engine in accordance with an illustrative embodiment. GPFS SNC architecture 500 has nodes 521-524, which access respective local disks. Each node owns a separate data set and performs computing operations on the data set. Each node has a write affinity mechanism that prefers to store files from a given data set to the disks local to the assigned node. This node is called the owner for the data set. For example, for file 1, upper layer 510 issues the write of file 1 to the owner node 521, which writes the file to its local disks.

Upper layer 510 also includes common hash engine and hash repository 511. Hash repository and common hash engine 511 performs a hash function on each file chunk and stores a location of each file chunk stored at one of nodes 521-524 in association with its hash value. The contents of a hash repository are described in further detail below with respect to FIG. 8. Upper layer 510 performs a hash function on file chunks of file 1 to generate hash values and looks up the hash values in hash repository 511 to determine whether identical file chunks already exist in nodes 522-524. For file chunks having identical copies at nodes 522-524, upper layer 510 identifies these nodes to be used as replication peer nodes.

Figures 6, 7, 8:
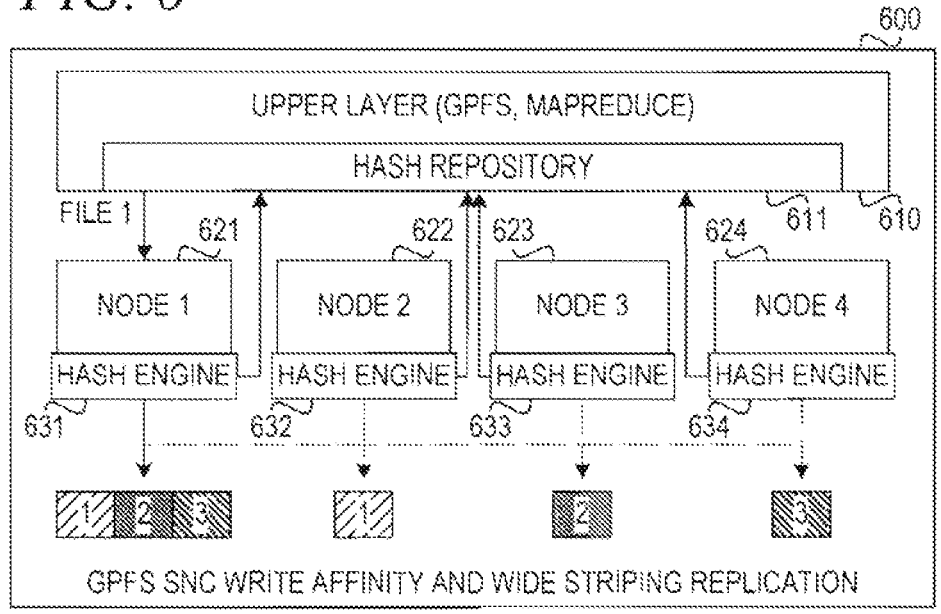
FIG. 6 is a block diagram of a general parallel file system with write striping using local hash engines in accordance with an illustrative embodiment.
FIG. 7 depicts an example file owner and replication node information table in accordance with an illustrated embodiment.
FIG. 8 depicts an example hash repository table in accordance with an illustrative embodiment.

FIG. 6 is a block diagram of a general parallel file system with write striping using local hash engines in accordance with an illustrative embodiment. GPFS SNC architecture 600 has nodes 621-624, which access respective local disks. Each node owns a separate data set and performs computing operations on the data set. Each node has a write affinity mechanism that prefers to store files from a given data set to the disks local to the assigned node. This node is called the owner for the data set. For example, for file 1, upper layer 610 issues the write of file 1 to the owner node 621, which writes the file to its local disks.

Upper layer 610 includes a common hash repository 611. Node 621 includes local hash engine 631, node 622 includes local hash engine 632, node 623 includes local hash engine 633, and node 624 includes local hash engine 634. Each node periodically updates file block hash values to common hash repository 611. In the depicted example, the owner node 621 uses its local hash engine 631 to perform a hash function on the file chunks to form hash values. Node 621 then queries common hash repository 611 to identify duplicate file chunks stored in nodes 622-624. Node 621 then selects replication peer nodes among nodes 622-624 based on identification of duplicate file chunks.

The hash engine may use a standard hash algorithm, such as secure hash algorithm (SHA-1) or message digest algorithm (MD5), for hash computation. These algorithms do not have much latency overhead or space overhead compared to duplicate storage or unnecessary transfer of file chunk.

FIG. 7 depicts an example file owner and replication node information table in accordance with an illustrated embodiment. The upper layer maintains the table in FIG. 7. This table stores information about owner node for files and replication nodes where data are spread in multiple chunks for replication. The upper layer updates the table during the file create/delete process.

FIG. 8 depicts an example hash repository table in accordance with an illustrative embodiment. This table stores a hash value for each file block. The table of FIG. 8 also stores information of the replication node where a given block replication copy is stored. This table is updated during the file create/delete process and is referenced while storing a new file to determine whether a replication peer node may already store data for a given file chunk.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 9:
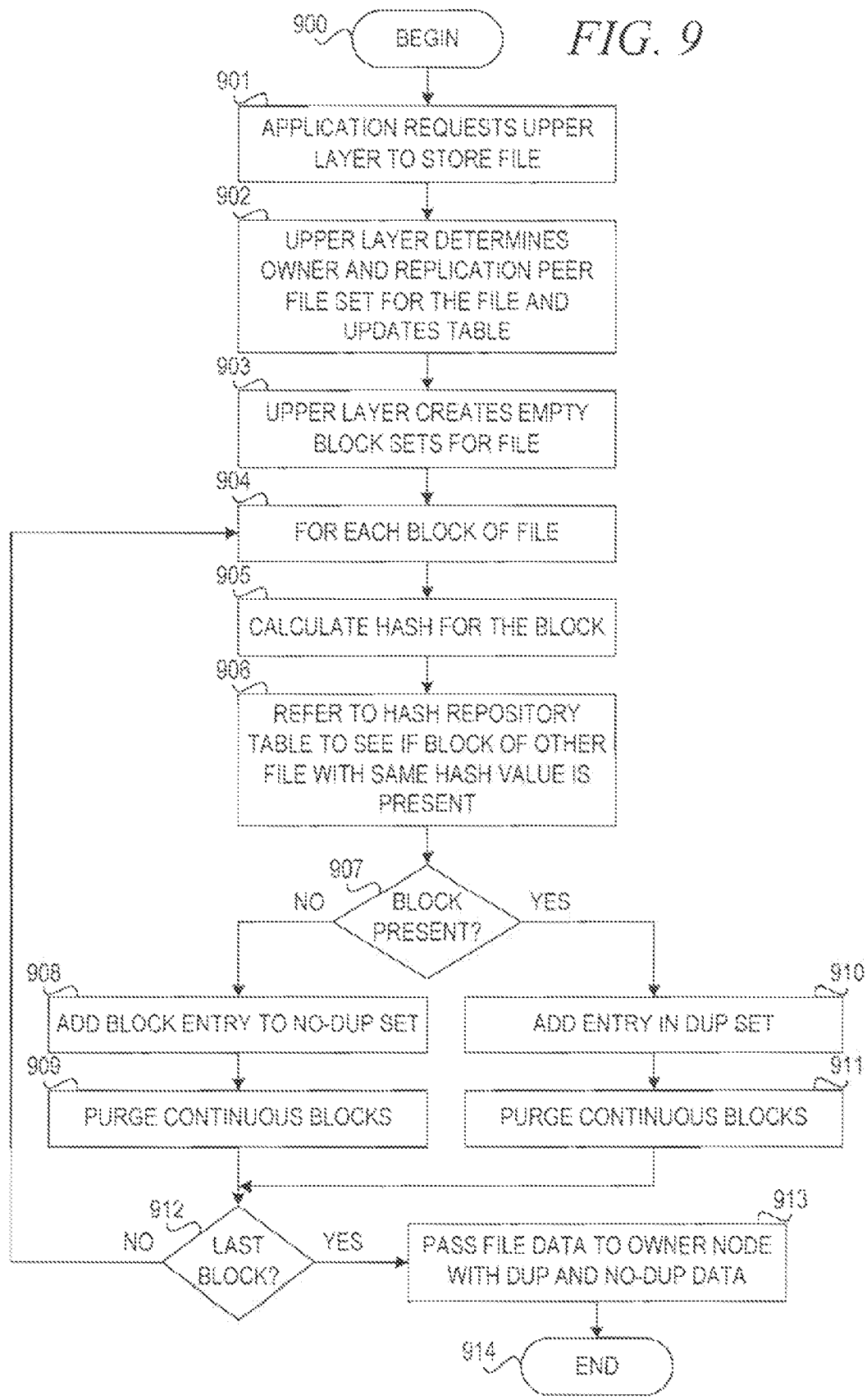
FIG. 9 is a flowchart illustrating determination of replication nodes with duplicate file chunks in accordance with an illustrative embodiment.

FIG. 9 is a flowchart illustrating operation of a mechanism for determination of replication nodes with duplicate file chunks in accordance with an illustrative embodiment. Operation begins (block 900), and the application requests the upper layer to store a given file (block 901). The upper layer determines the owner node and replication peer node set (REPL_PEER_SET) for the file and updates the file owner and replication node information table (block 902). An example of the file node and replication node information table is shown in FIG. 7.

The mechanism then creates empty block sets (DUP_SET1 and NODUP_SET2) for the file (block 903). For each block of the file (block 904), the mechanism calculates a hash for the block (block 905) and refers to the hash repository table to see if a block of another file with the same hash value is present at one of the replication peer nodes (block 906). The mechanism then determines if such a block entry is present for a given replication node (block 907).

If such an entry is not found, the mechanism adds a block entry for the block to NODUP_SET2 (block 908) and purges continuous blocks from NODUP_SET2 (block 909). If such a block entry is found in block 907, the mechanism adds a tuple <FileBlockNo, NodeX, File2, BLOCK2> to the DUP_SET1 (block 910) and purges continuous blocks from DUP_SET1 if they have the same node (block 911).

After purging entries in block 909 or block 911, the mechanism determines whether the current block is the last block of the file (block 912). If the current block is not the last block, operation returns to block 904 to consider the next block of the file. If the current block is the last block in block 912, the mechanism passes the file data to the owner node with the DUP_SET1 and NODUP_SET2 information (block 913). Thereafter, operation ends.

Figure 10:
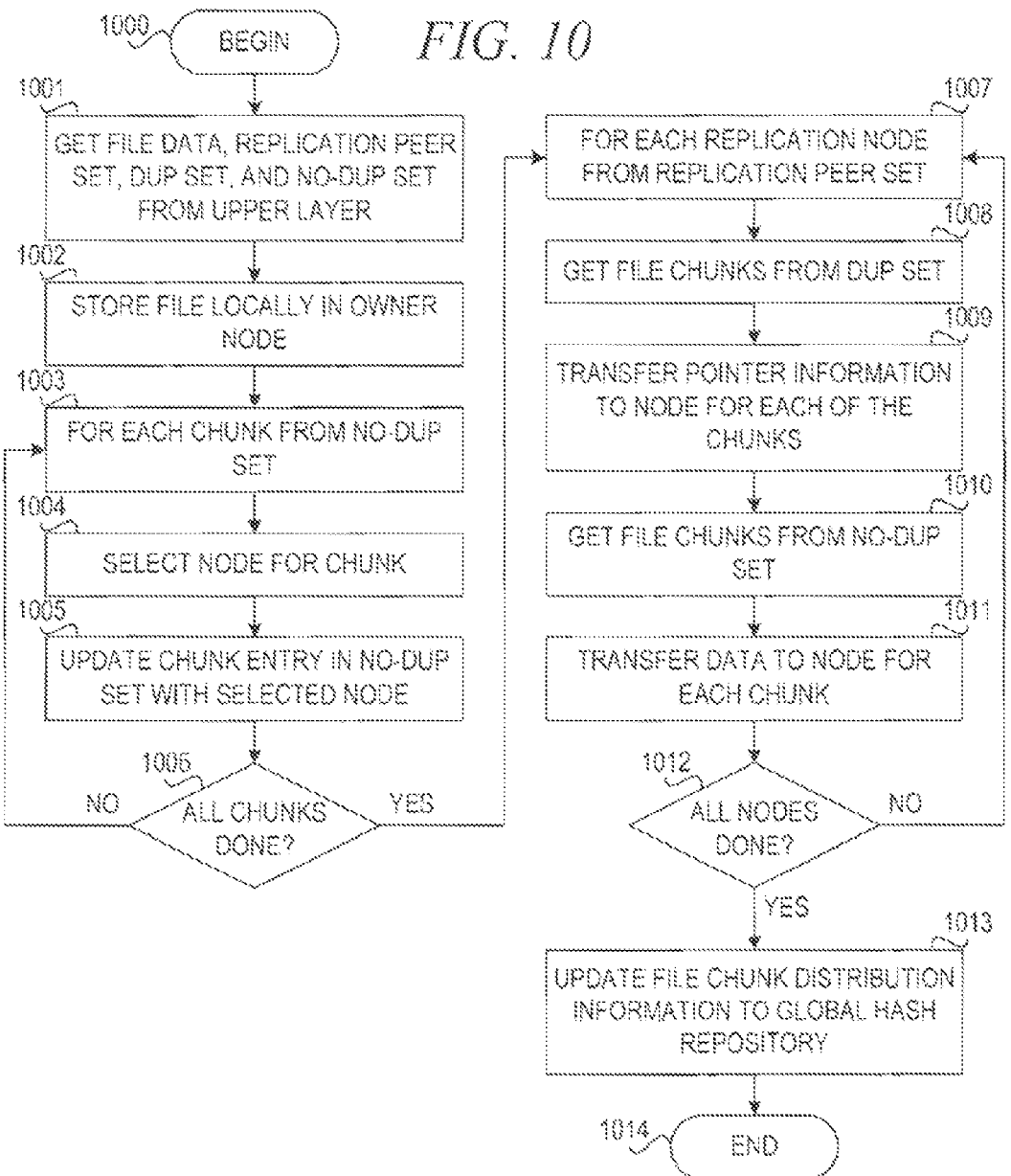
FIG. 10 is a flowchart illustrating replication node selection for a given file chunk at an owner node in accordance with an illustrative embodiment.

FIG. 10 is a flowchart illustrating operation of a mechanism for replication node selection for a given file chunk at an owner node in accordance with an illustrative embodiment. Operation begins (block 1000), and the mechanism gets file data, the replication peer set, and duplication set (DUP_SET1) and no-duplication set (NODUP_SET2) from the upper layer (block 1001). The mechanism stores the file locally in the owner node local disks (block 1002).

For each chunk from the no-duplication set (NODUP_SET2) (block 1003), the mechanism selects a node for the chunk based on replication data balancing requirements so that file data is uniform across nodes (block 1004). The mechanism may split chunks if required. The mechanism updates the chunk entry in the no-duplication set with the selected node (block 1005). The mechanism then determines whether all chunks in the no-duplication set have been considered (bock 1006). If all chunks in the no-duplication set have not been considered, operation returns to block 1003 to consider the next chunk in the no-duplication set.

If all chunks in the no-duplication set have been considered in block 1006, then for each replication node from the replication peer set (block 1007), the mechanism gets file chunks from the duplication set (DUP_SET1) assigned to the replication node (block 1008). The mechanism transfers pointer information to the replication node for each of the chunks in the duplication set assigned to the replication node (block 1009). The mechanism then gets file chunks from the no-duplication set assigned to the replication node (block 1010) and transfers the file chunks to the selected node for each chunk (block 1011). The mechanism determines whether all nodes in the replication peer set have been considered (block 1012). If all replication peer nodes have not been considered, operation returns to block 1007 to consider the next replication node from the replication peer set.

If all replication nodes have been considered in block 1012, the mechanism updates file chunk distribution information to the global hash repository (block 1013). Thereafter, operation ends (block 1014).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for replication of a given file block in a general parallel file system share nothing cluster such that a replication peer node for given file chunk is selected based on the already present data contents at the given peer node. The mechanism selects replication peers to optimize data traffic during node-to-node replication and avoid duplicate replication data storage. The mechanism consults a hash repository to determine replication nodes that already have some of the file chunks. If the system already has a duplication engine, the mechanism may use the hash functionality of the duplication engine for the hash repository. The mechanism passes this information to the owner node, which refers this information and determines a replication node for each given file chunk. For peer nodes already having a given file chunk, the owner node passes a file chunk pointer, thus optimizing node-to-node duplicate data traffic. The replication node, responsive to receiving file chunk pointer information, stores pointer information as it is or creates a copy for file chunk locality.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for replicating writing of a file with striping, the method comprising:
   writing a file at an owner node within a plurality of nodes in a data processing system;
   dividing the file into a plurality of file chunks;
   performing a hash function on each file chunk to form a hash value;
   looking up each hash value in a hash repository;
   identifying at least one replication node within the plurality of nodes having a duplicate copy of a respective file chunk within the plurality of file chunks responsive to a hash value of the respective file chunk having an entry in the hash repository;
   adding an entry to a duplicate set for each file chunk for which a duplicate copy is already stored at a replication node and adding an entry to a no-duplicate set for each file chunk for which no duplicate copy is stored at a replication node;
   selecting a plurality of replication nodes, including the at least one replication node, for the plurality of file chunks based on the duplicate set and the no-duplicate set; and
   replicating the file at the plurality of replication nodes based on the selection of the plurality of replication nodes, wherein replicating the file at the plurality of replication nodes comprises transferring pointer information for each file chunk having an entry in the duplication list to a corresponding selected replication node, wherein the pointer information points to the copy of the file chunk at the corresponding selected replication node.

2. The method of claim 1, wherein writing a file at an owner node comprises:
   receiving a request to write a file at an upper layer in the data processing system;
   selecting, by the upper layer, the owner node from the plurality of nodes; and
   writing, by the upper layer, the file to the owner node, wherein the owner node writes the file to one or more local disks that are local to the owner node.

3. The method of claim 2, wherein the local node does not share the one or more local disks with others of the plurality of nodes.

4. The method of claim 1, wherein performing the hash function on each file chunk is performed by a common de-duplication engine in an upper layer in the data processing system.

5. The method of claim 1, wherein performing the hash function on each file chunk is performed by a local hash engine at the owner node.

6. The method of claim 1, wherein the hash repository is within an upper layer in the data processing system.

7. The method of claim 1, wherein identifying at least one replication node having a duplicate copy of a respective file chunk comprises passing the duplicate set and the no-duplicate set to the owner node.

8. The method of claim 1, wherein selecting a plurality of replication nodes for the plurality of file chunks comprises selecting a replication node within the plurality of nodes for each file chunk having an entry in the no-duplicate set based on replication data balancing requirements such that file data are uniform across the plurality of nodes.

9. The method of claim 1, wherein replicating the file at the plurality of replication nodes comprises creating, by the selected replication node, a copy of the file chunk data.

10. A computer program product comprising a non-transitory computer readable storage medium having a computer readable program stored therein, wherein the computer readable program, when executed on a computing device, causes the computing device to:
    write a file at an owner node within a plurality of nodes in a data processing system;
    divide the file into a plurality of file chunks;
    perform a hash function on each file chunk to form a hash value;
    look up each hash value in a hash repository;
    identify at least one replication node within the plurality of nodes having a duplicate copy of a respective file chunk within the plurality of file chunks responsive to a hash value of the respective file chunk having an entry in the hash repository;
    add an entry to a duplicate set for each file chunk for which a duplicate copy is already stored at a replication node and add an entry to a no-duplicate set for each file chunk for which no duplicate copy is stored at a replication node;
    select a plurality of replication nodes, including the at least one replication node, for the plurality of file chunks based on the duplicate set and the no-duplicate set; and replicate the file at the plurality of replication nodes based on the selection of the plurality of replication nodes, wherein replicating the file at the plurality of replication nodes comprises transferring pointer information for each file chunk having an entry in the duplication list to a corresponding selected replication node wherein the pointer information points to the copy of the file chunk at the corresponding selected replication node.

11. The computer program product of claim 10, wherein writing a file at an owner node comprises:
receiving a request to write a file at an upper layer in the data processing system;
selecting, by the upper layer, the owner node from the plurality of nodes; and
writing, by the upper layer, the file to the owner node, wherein the owner node writes the file to one or more local disks that are local to the owner node.

12. The computer program product of claim 10, wherein performing the hash function on each file chunk is performed by a common de-duplication engine in an upper layer in the data processing system.

13. The computer program product of claim 10, wherein performing the hash function on each file chunk is performed by a local hash engine at the owner node.

14. The computer program product of claim 11, wherein the local node does not share the one or more local disks with others of the plurality of nodes.

15. The computer program product of claim 10, wherein the hash repository is within an upper layer in the data processing system.

16. The computer program product of claim 10, wherein identifying at least one replication node having a duplicate copy of a respective file chunk comprises passing the duplicate set and the no-duplicate set to the owner node.

17. The computer program product of claim 10, wherein selecting a plurality of replication nodes for the plurality of file chunks comprises selecting a replication node within the plurality of nodes for each file chunk having an entry in the no-duplicate set based on replication data balancing requirements such that file data are uniform across the plurality of nodes.

18. The computer program product of claim 10, wherein replicating the file at the plurality of replication nodes comprises creating, by the selected replication node, a copy of the file chunk data.

19. An apparatus, comprising:
a processor; and
a memory coupled to the processor, wherein the memory comprises instructions which, when executed by the processor, cause the processor to:
write a file at an owner node within a plurality of nodes in a data processing system;
divide the file into a plurality of file chunks;
perform a hash function on each file chunk to form a hash value;
look up each hash value in a hash repository;
identify at least one replication node within the plurality of nodes having a duplicate copy of a respective file chunk within the plurality of file chunks responsive to a hash value of the given file chunk having an entry in the hash repository responsive to a hash value of the respective file chunk having an entry in hash repository;
add an entry to a duplicate set for each file chunk for which a duplicate copy is already stored at a replication node and add an entry to a no-duplicate set for each file chunk for which no duplicate copy is stored at a replication node;
select a plurality of replication nodes, including the at least one replication node, for the plurality of file chunks based on the duplicate set and the no-duplicate set; and
replicate the file at the plurality of replication nodes based on the selection of the plurality of replication nodes, wherein replicating the file at the plurality of replication nodes comprises transferring pointer information for each file chunk having an entry in the duplication list to a corresponding selected replication node, wherein the pointer information points to the copy of the file chunk at the corresponding selected replication node.

20. The apparatus of claim 19, wherein performing the hash function on each file chunk is performed using a common de-duplication engine in an upper layer in the data processing system.

21. The apparatus of claim 19, wherein performing the hash function on each file chunk is performed using a local hash engine at the owner node.

22. The apparatus of claim 19, wherein writing a file at an owner node comprises:
receiving a request to write a file at an upper layer in the data processing system;
selecting, by the upper layer, the owner node from the plurality of nodes; and
writing, by the upper layer, the file to the owner node, wherein the owner node writes the file to one or more local disks that are local to the owner node.

23. The apparatus of claim 22, wherein the local node does not share the one or more local disks with others of the plurality of nodes.

24. The apparatus of claim 19, wherein the hash repository is within an upper layer in the data processing system.

25. The apparatus of claim 19, wherein replicating the file at the plurality of replication nodes comprises creating, by the selected replication node, a copy of the file chunk data.

* * * * *